(12) United States Patent
Bohmer et al.

(10) Patent No.: US 6,168,017 B1
(45) Date of Patent: *Jan. 2, 2001

(54) DEVICE FOR STORING AND DISPENSING FISH HOOKS

(75) Inventors: William Bohmer, Succasunna; Douglas K. McGowan, Hackettstown, both of NJ (US)

(73) Assignee: Thunder Bay Fishing Company, Inc., Hackettstown, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/686,330

(22) Filed: Jul. 25, 1996

(51) Int. Cl.[7] .................................................. A01K 97/06
(52) U.S. Cl. ........................................ 206/315.11; 43/57.1
(58) Field of Search ........................... 206/315.11, 315.1, 206/338, 340, 341, 37, 38, 495, 486, 490, 488, 489, 348; 43/54.1, 57.1, 57.2

(56) References Cited

U.S. PATENT DOCUMENTS

| | | | |
|---|---|---|---|
| 3,430,379 | * 3/1969 | Wolfrum | 43/57.1 |
| 3,464,143 | * 9/1969 | Scott | 43/57.1 |
| 4,468,882 | * 9/1984 | Marusak | 43/57.1 |
| 4,769,941 | * 9/1988 | Schmidt | 43/57.1 |
| 4,796,380 | * 1/1989 | Beese | 43/57.1 |
| 4,862,635 | * 9/1989 | Conte | 206/315.11 |

* cited by examiner

Primary Examiner—Paul T. Sewell
Assistant Examiner—Luan K. Bui
(74) Attorney, Agent, or Firm—John Q. McQuillan

(57) ABSTRACT

The disclosure relates to a device for storing and dispensing small articles such as fish hooks. The dispenser is formed of two oppositely disposed side portions or with a spaced opening therebetween. Each side portion has a flexible cushioned flat surface adjacent the spaced opening. The side portions are positioned against tie flexible cushioned flat surfaces to create a means for entrapping objects between the closed surfaces of the side portions when a force is used to hold one side portion against the other. The articles may be trapped completely inside the perimeter of the closed surfaces or partially trapped, allowing portions of the articles to extend just beyond the perimeter. The force holding the two side portions together is sufficient to hold the objects securely between the side portions also enabling articles extending beyond the periphery of the side portions to be removed individually with moderate force. The disclosure also relates to a dispenser having a peripheral groove or a plurality of peripheral slits to store and dispense small articles.

12 Claims, 6 Drawing Sheets

DEVICE FOR STORING AND DISPENSING FISH HOOKS

This invention relates to a device for storing and dispensing small articles. More in particular this invention relates to a device for storing and dispensing fish hooks.

BACKGROUND OF THE INVENTION

Fish hooks are hardened metal wire devices with one end sharpened to a point and the other end formed into a closed loop. The closed loop is used as the means for connecting the hook to spooled lines. The hook is usually formed in a question-mark shape with the closed loop at the bottom. The hook does not facilitate sorting and dispensing thereof due to entanglement caused by the irregular shape of the hook and due to the hazard of its sharpened end. Thus fish hooks become entangled and ensnared when placed in a closed container if the container is disturbed in a manner which causes the hooks to move. Reliable dispensing can only be rendered if individual hooks are placed and sorted in separate isolated containers which are then accessed individually. Another difficult method of storing hooks is to tape individual hooks to a substrate such as a sheet of cardboard. The hooks are then peeled off as needed which usually results in the lost of hooks due to the cumbersome nature of the procedure. Another method is to stick the sharp ends of a number of hooks into a mass of soft material such as "STYROFOAM" material. The number of hooks which can be removed reliably is limited due to the resistance of the material when pulling the hooks out of the mass of material.

SUMMARY OF THE INVENTION

An object of the invention is to provide a dispenser which provides convenient storage of and access to small devices such as fish hooks in a convenient and reliable manner. Another object of the invention is to facilitate isolation of the sharp end of a fish hook during storage in the dispenser. Still another object of the invention is to simplify attachment of hooks to fishing lines by providing a means for connecting of a fishing line to the closed loop end of a hook before removal of the hook from the dispenser. A further object of the invention is to provide a dispenser from materials which can float, if accidentally dropped into water. Another object of the invention is to provide a disposable single-use embodiment of the dispenser which is formed from a single component of material. An additional object of the invention is to provide a disposable single use embodiment of the dispenser which can be loaded with fish hooks by the manufacturer of the hooks.

DESCRIPTION OF THE PREFERRED EMBODIMENTS

Figure 1:
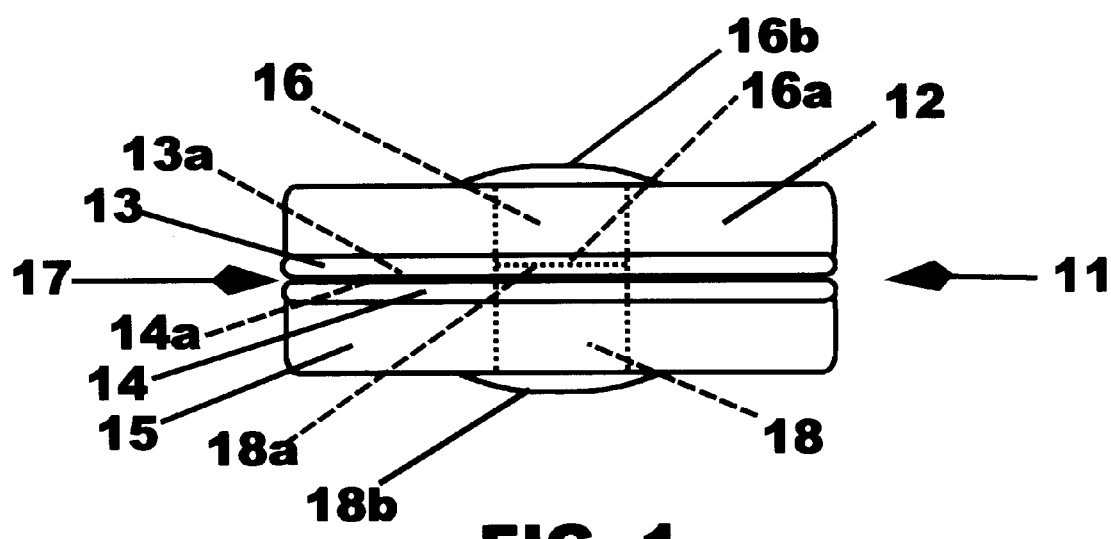
FIG. 1 is an elevation view of the multiple component embodiment of the dispenser of the invention.
Figure 2:
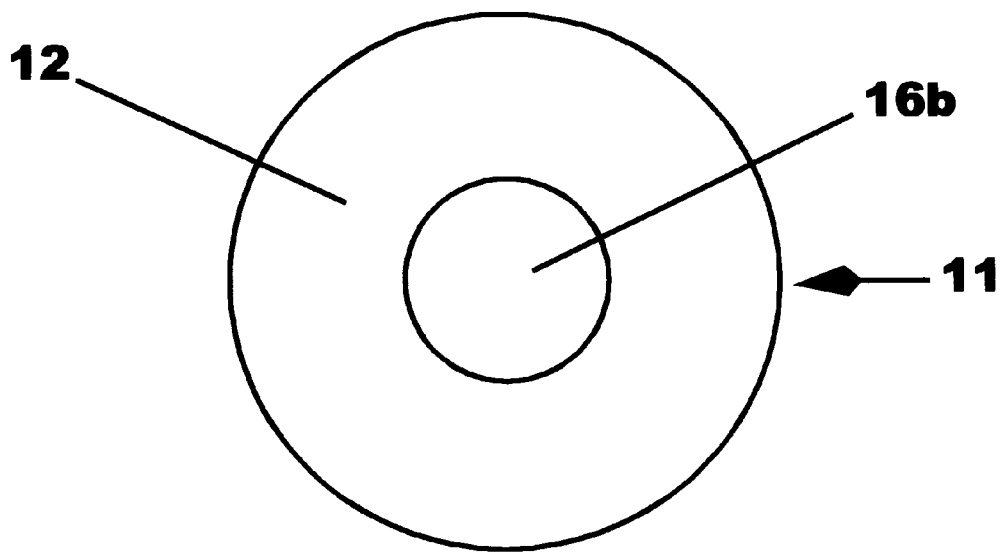
FIG. 2 is a plan view of the multiple component embodiment of the dispenser invention shown in FIG. 1.
Figure 3:
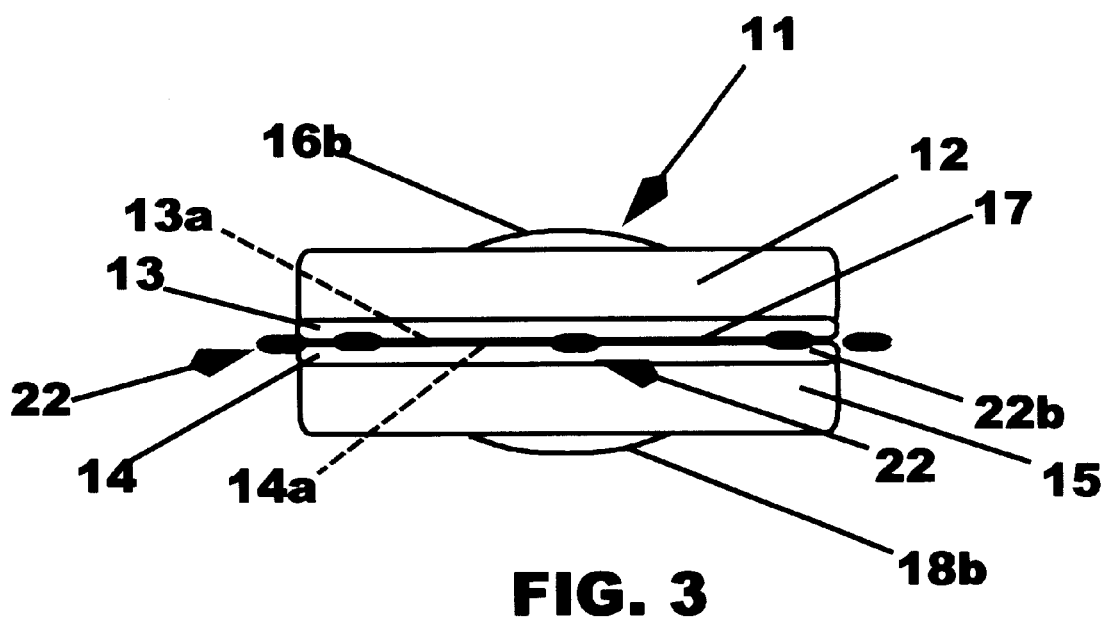
FIG. 3 is an elevation view of the same multiple component embodiment of the dispenser of the invention shown in FIG.1 with small devices such as fish hooks shown loaded into the dispenser.

In FIGS. 1 and 2, elevation and plan views of the dispenser 11 are shown, respectively. The dispenser 11 is composed of six parts. The dispenser 11 has a main body formed by two disks or side portions 12 and 15 with flexible pads 13 and 14 having surfaces 13a and 14a, respectively, permanently attached to one side of each disk. The two disks 12 and 15 are positioned with the exposed face of the flexible pads 13 and 14 contiguous to each other. The disks are held together by means of two pins 16 and 18. The inner ends 16a and 18a of the pins are bonded together, thereby rendering a gap 17 space between the pads 13 and 14. The diameter of the head 16b and 18b of the pins 16 and 18, respectively, is preferably about one third of the total diameter of each of the disks 11 and 16. The pressure between the flexible pads 13 and 14 is determined by the material used for the pads and the total length of the individual pins 16 and 18 when bonded together. The resulting pressure between the flexible pads 13 and 14 is selected to be sufficient to hold any fish hook inserted between the pads, but not so as to prevent easy removal of the fish hook. The contiguous flexible pads form a slit-like opening or slot therebetween to receive a fish hook when inserted between the pads. As shown in FIGS. 1 and 3, each of flexible pads 13 and 14 can be provided with layers 13a and 13b, respectively, adapted to enhance the engagement and retention of an article such as fish hook stored therebetween. Layers 13a and 13b can be of adhesive material.

Figure 4:
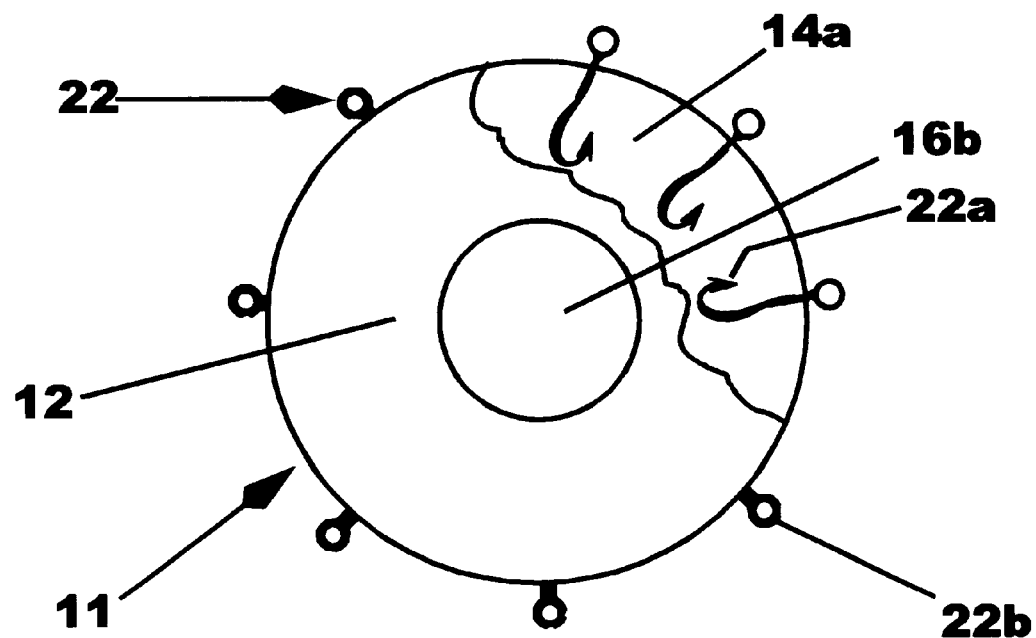
FIG. 4 is a plan view of the same multiple component embodiment of the dispenser of the invention shown in FIG. 3 with small devices such as fish hooks shown loaded into the dispenser.

In FIGS. 3 and 4, an elevation and plan view of the dispenser 11 is shown with fish hooks 22 inserted between the flexible pads 13 and 14. The fish hooks 22 are inserted with the sharp end 22a in the gap 17 between the pads with the closed looped end 22b of the fish hook 22 extending outside the periphery of the flexible pads 13 and 14.

The dispenser 11 of the invention allows the user to attach a line to the fish hook 22 safely in that the sharp end 22a of the hook 22 remains inside the dispenser 11. The user can easily tie a knot in the closed looped end 22b since the user can release the dispenser 11 and thereby enable the dispenser to hang from the line until the line is completely secured. When the line is completely attached to the closed looped end 22b of the fish hook 22, the user then grasps the dispenser 11 with one hand and the line with the other and removes the rest of the hook 22 from the dispenser 11. The round or circular shape of the dispenser 11 provides easy access to the closed end 22b of the fish hooks 22, preventing the neighboring hooks 22 from interfering with the attachment process. The disks or side portions of the dispenser 11 can be formed from a material which will float on water, if the dispenser is accidentally dropped. The dispenser may be of a bright color to aid in finding the dispenser if dropped.

Figure 5:
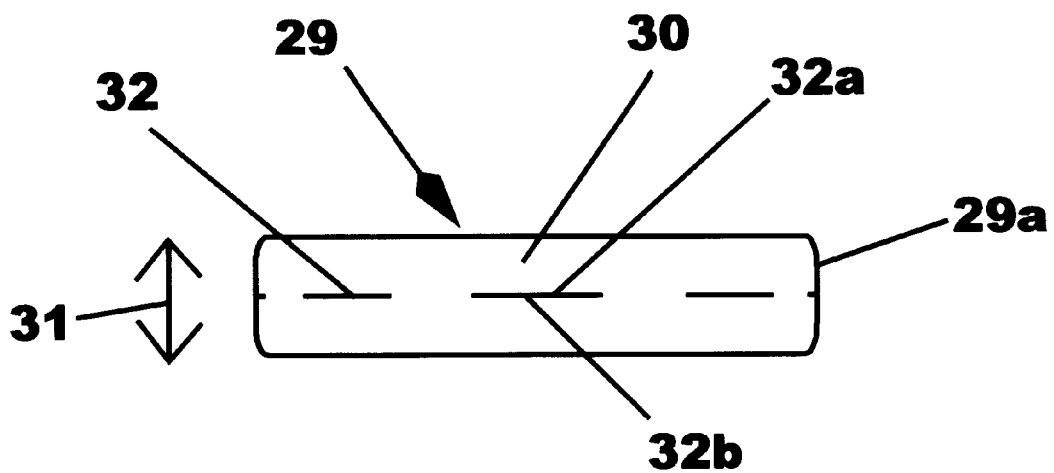
FIG. 5 is an elevation view of a single component embodiment of the dispenser of the invention.
Figure 6:
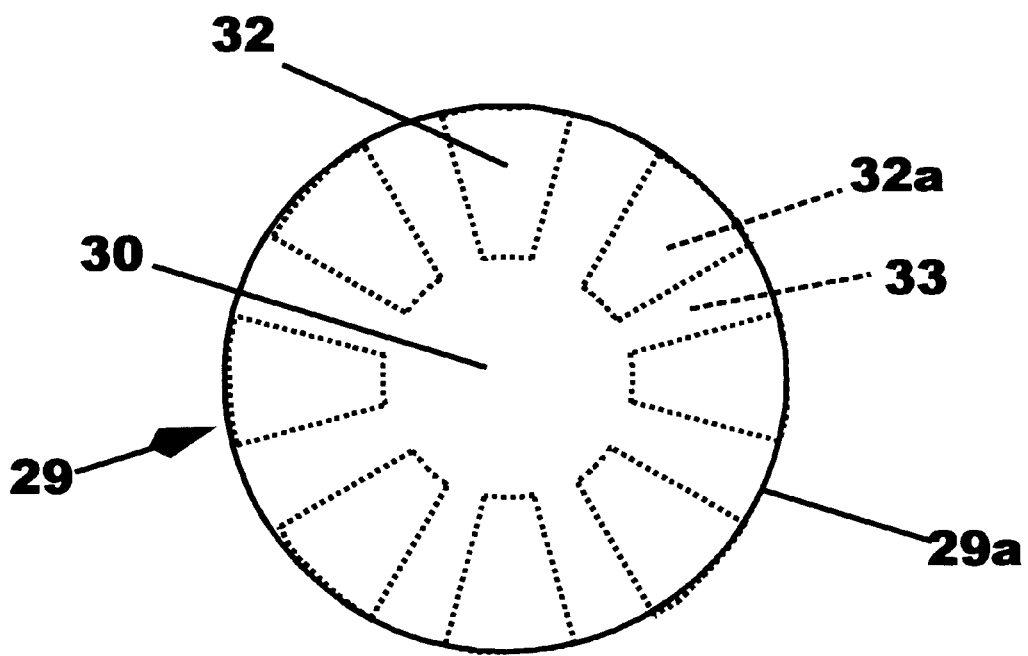
FIG. 6 is a plan view of the single component embodiment of the invention shown in FIG. 5 with small devices such as fish hooks shown loaded into the dispenser.

FIGS. 5 and 6 are an elevation view and a plan view, respectively, of another embodiment of the dispenser 29 of the invention. The dispenser 29 is comprised of a single piece body 30 of soft material. The single piece body 30 of the dispenser is in the shape of a disk with a thickness 31 approximately twenty-five percent of the diameter of the dispenser. Equally spaced wedge-shaped slices or cuts 32 are formed in the peripheral wall 29a area of the dispenser 29 by thin cut or narrow recesses 32 extending into the dispenser 29 and extending towards the center of the dispenser 29. The compartments can be formed by slitting the dispenser with a thin blade. The thin blade of a fixed length and fixed thickness determines the depth of the cut and the thickness of the cut. The cuts 32 form wedge-shaped compartments 32a which are wider than they are high. The body 30 of the dispenser is formed of a soft or elastic material such as plastic foam which causes the top and bottom surfaces 32b and 32c of the compartments 32 to collapse upon each other. The compartments 32a remain closed when there are no objects between the top and bottom surfaces of the wedge-shaped compartments 32a. Another method of forming the compartments 33 is to mold them into the plastic foam as it is manufactured with removable inserts built into the molding process. The selection of the disk material is important in that any object caught between the top and bottom surfaces of the wedge-shaped compartments 32 should be held firmly, but not so firmly as to prevent removal by adequate force.

Figure 7:
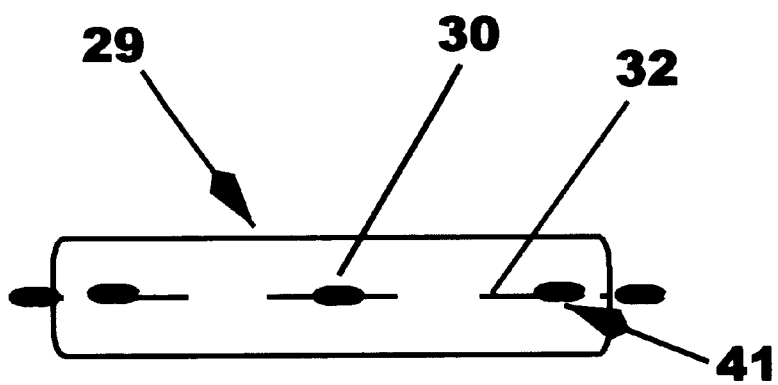
FIG. 7 is an elevation view of another single component embodiment of the dispenser of the invention.
Figure 8:
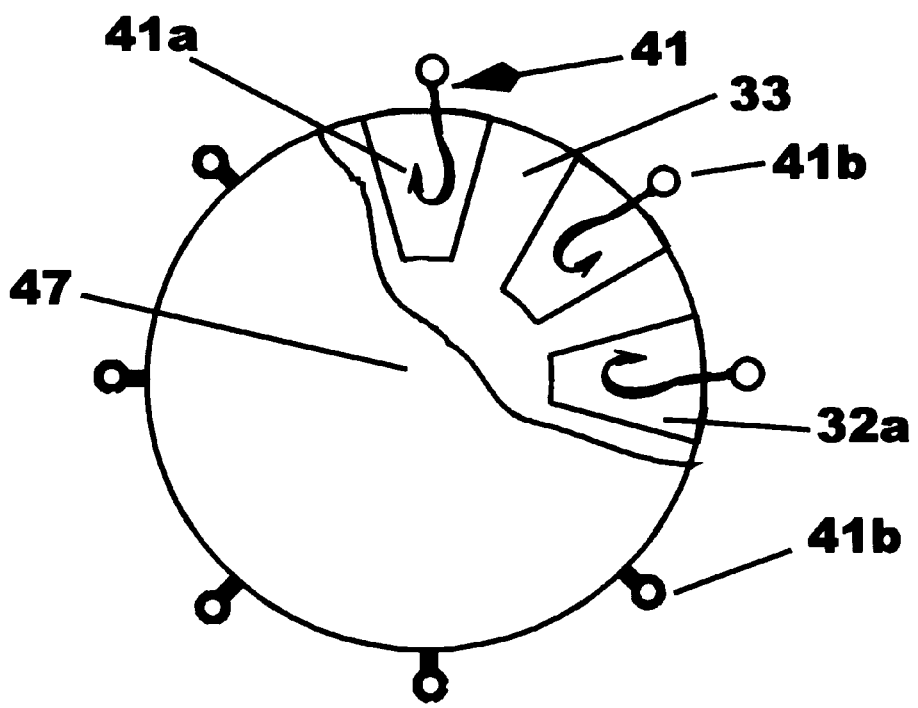
FIG. 8 is a plan view of the other single component embodiment of the dispenser of the invention shown in FIG. 7.

In FIGS. 7 and 8 which are an elevation and a plan view, respectively, of the dispenser 29 is shown with fish hooks 41, inserted into the wedge-shaped compartments 32a. The fish hooks 41 are inserted with the sharp end 41a inside the wedge-shaped compartments 32a and the closed looped ends 41 b of the fish hooks 41 extending just outside the periphery of the wedge-shaped compartments 32a. The wedge-shaped compartments 32a are separated and isolated from each other by a space 33 between each compartment 32a. The space 34 enables each wedge-shaped compartment 32a to flex and collapse independently from its neighbor, thereby enabling storage of different sized hooks 41 in one dispenser. The dispenser of the invention enables the user to attach a line to the fish hook safely in that the sharp end 41a of the hook 41 remains inside the dispenser 29. The user can easily tie a knot in the closed looped end 41b since the user can release the dispense, 29 and permit it to hang from the line until the line is completely secured. When the line is completely attached to the closed looped end 41b of the fish hook 41, the user can hold the dispenser 29 with one hand and the line with the other to enable the remainder of the hook 41 to be removed from the dispenser. The round or circular shape of the dispenser 29 provides easy access to the closed end 41b of the fish hooks 41 prevent the neighboring hooks 41 from interfering with the attachment process. The body of dispenser 29 may be of a material which will float in water if accidentally dropped thereinto. The dispenser may be of a bright color to aid in finding the dispenser if dropped.

Figure 9:
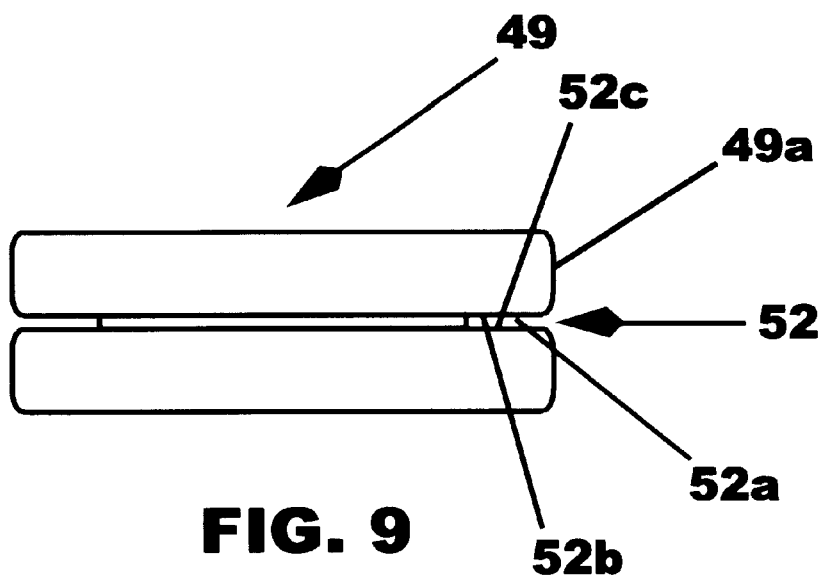
FIG. 9 is an elevation view of still another single component embodiment of the dispenser of the invention.
Figure 10:
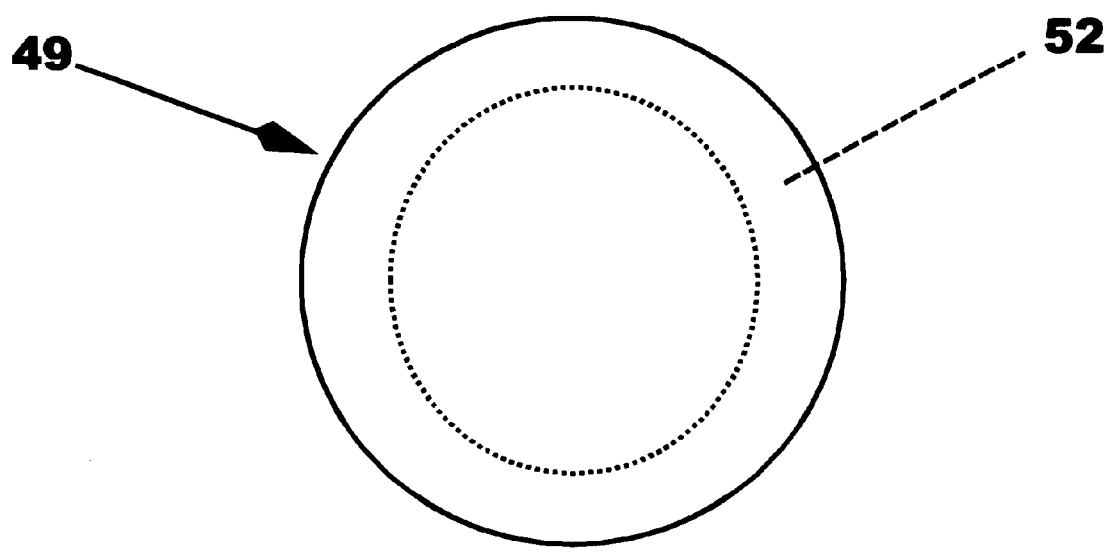
FIG. 10 is a plan view of the still other single component embodiment of the dispenser of the invention shown in FIG. 9 having objects such as fish hooks shown loaded into the dispenser.

In FIGS. 9 and 10 which are elevation and plan views, respectively, another embodiment of the dispenser 49 is shown. The dispenser 49 can be formed of a single piece of material. The dispenser 49 is in a disk form with a continuous groove 52 formed in the center of the peripheral or circumferential wall 49a. The continuous groove 52 extends throughout the circumferential wall 49a of the disk material and extends into the material to a depth which is approximately twenty percent of the diameter of the dispenser 49. The result is a continuous grooved circular compartment 52a with top surface 52b and bottom surface 52c which will collapse upon each other when no object is placed therein. The selection of the disk material is important in that any object caught between the top and bottom surfaces 52b and 52c of the continuous grooved circular compartment 52a should be held firmly, but not so firmly as to prevent removal by adequate force.

Figure 11:
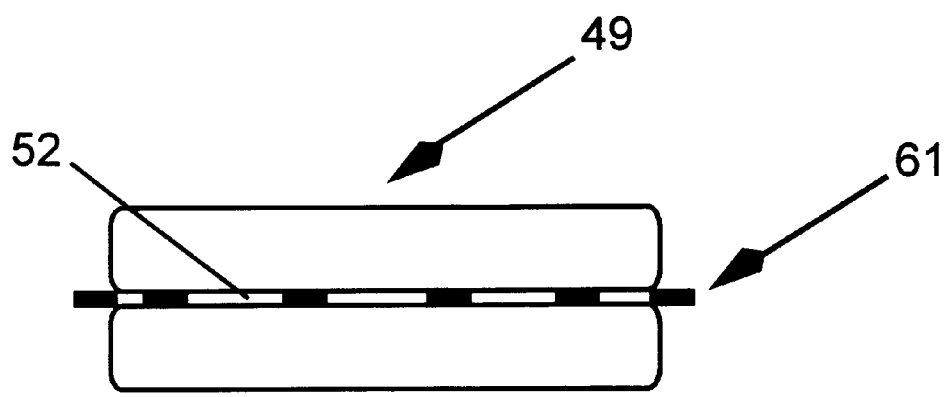
FIG. 11 is an elevation view of the dispenser of the invention having a continuously grooved circular compartment to receive the pointed ends of fish hooks.
Figure 12:
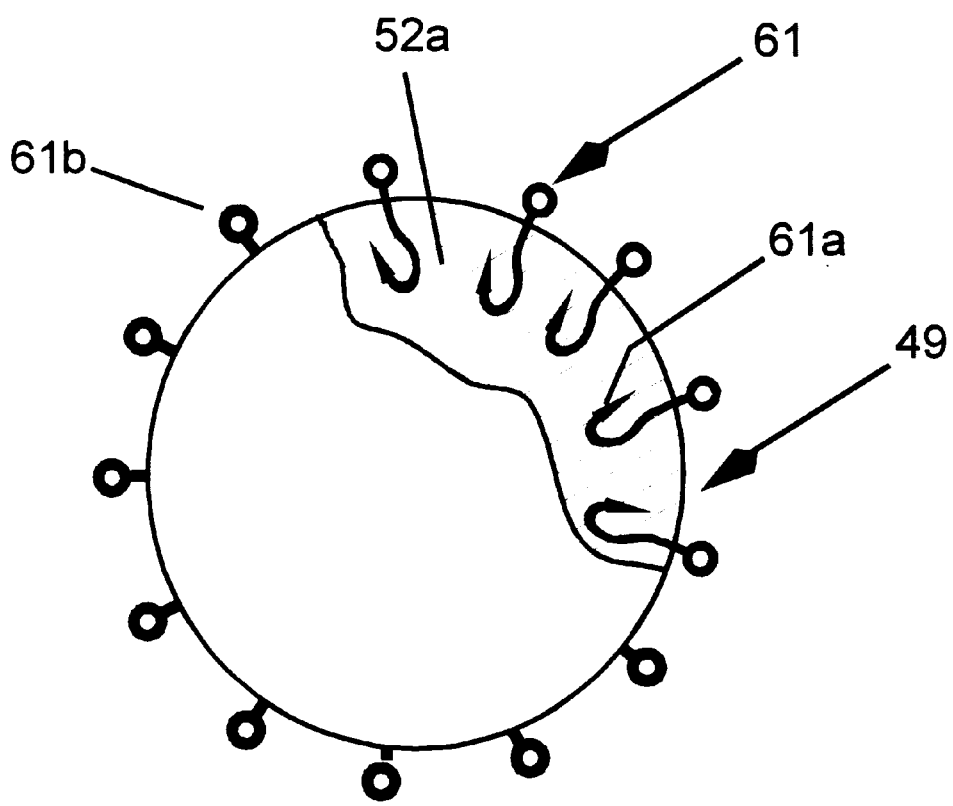
FIG. 12 is a plan view partially cut away and showing the pointed ends of fish hooks disposed in the continuously grooved circular compartment.

In FIGS. 11 and 12 which are elevation and plan views, respectively, of the dispenser 49, fish nooks 61 are shown inserted in the continuous grooved circular compartment 52a. The fish hook 61 are inserted with the sharp end 61a inside the continuous grooved circular compartment 52a and the closed looped end of the fish hook 61b extending just outside the periphery of the continuous grooved circular compartment 52a. This arrangement enables the user to attach a line to the fish hook safely in that the sharp end 61a of the hook 61 remains inside the dispenser 49. The user can easily tie a knot in the closed looped end 61b since the user can release the dispenser and permit it to hang from the line until the line is completely secured. When the line is completely attached to the closed looped end 61b of the fish hook 61, the user can hold the dispenser 49 with one hand and the line with the other and removes the rest of the hook 61 from the dispenser 49. The round shape of the dispenser 49 provides easy access to the closed end 61b of the fish hook 61b, thereby preventing the neighboring hooks from interfering with the attachment process. The body of dispenser 49 may be formed from a material which will float in water if accidentally dropped. The body of dispenser 49 may be of a bright color in order to aid in finding the dispenser 49 if dropped.

The shape of the dispenser described in the embodiments of the invention is preferably round or circular since a round-shaped dispenser provides ease of attaching spooled lines to the closed looped end of a fish hook when isolated from one another as the end of a spoke in a wheel; however, other shapes of the dispenser such as square, rectangular, or elongated can be used as well, but do not offer the ease of attachment rendered by a round or circular shape.

The dispenser of the invention can be formed or molded from a substantially transparent resin material such a methyl methacrylate, polycarbonate, polyester, polyethylene, and the like in order that the small articles such as fish hooks can be seen through the transparent material when the small articles are disposed in the groove, slot, or compartments of the dispenser. Thus the transparent material enables and facilitates the user in recognizing, identifying, and selecting the small article such as a fish hook to be removed by the user from storage in the dispenser.

What is claimed is:

1. A device for storing and dispensing small articles comprising a body having a pair of oppositely disposed and oppositely facing side portions and an outer portion disposed about the periphery of each of the side portions, the pair of side portions having a central portion joining the side portions to one and another, the outer portions having an opening therein disposed between the side portions and extending throughout the periphery of the side portions toward and ending adjacent the central portion, the opening having facing parallel surfaces collapsed upon each other in a rest position, the facing surfaces of the opening being adapted to receive a small article paced therein with the facing surfaces engaging the small article during storage therein and during dispensing of the small article therefrom.

2. A device in accordance with claim 1 which each of the oppositely disposed and facing side portions of the body comprises a disk and means for mounting the disks with the side portions in a facing relationship and with the outer portion of each of the disks being spaced apart in a facing relationship to form the opening therebetween, the means for mounting the disks including the central portion joining the side portions to one another.

3. A device in accordance with claim 2 in which the means for mounting the disks of the side portions in a facing relationship comprises at least one pin extending through the disks.

4. A device in accordance with claim 3 in which the at least one pin comprises a pair of pins, each of the pins extending through and being engaged with a different one of the disks and each of the pins having an end portion attached to one another to position the disks with the opening in the outer portion of the body disposed between the disks.

5. A device in accordance with claim 4 in which each of the pair of pins has a head portion engaging the outer surface of a different one of the disks to secure the pins with respect to the disks.

6. A device in accordance with claim 2 in which the outer portion of each disk spaced apart in a facing relationship to form an opening therebetween having facing surfaces further comprising a layer disposed on the facing surfaces contiguous to one another and formed from a material adapted to enhance the engagement and retention of an article to be stored in the opening.

7. A device in accordance with claim 6 in which the layer disposed on the oppositely disposed facing surface of each disk is of an adhesive material to engage and retain an article to be stored therein.

8. A device in accordance with claim 1 in which the opening disposed in the outer portion of the body comprises a slot of constant width extending into the body and ending adjacent to the central portion joining the side portions to one another and forming a compartment in the body for storage therein and dispensing therefrom of a small article.

9. A device in accordance with claim 1 in which the body is formed of elastic material, the opening in the body of elastic material being adapted to expand and grip a small article disposed therein and being adapted to reduce in size when a small article is removed from the opening.

10. A device in accordance with claim 1 in which the body is formed of transparent material which enables a small article disposed in the opening to be viewed by a user in selecting the small article to be removed from the opening.

11. A device for storing and dispensing small articles comprising a body portion having oppositely disposed side surfaces and a peripheral surface extending about the exterior of the body portion between the oppositely disposed side surfaces, the side surfaces having a central portion joining the side surfaces to one another, the peripheral surface and the body portion adjacent to the peripheral surface having a narrow recess of predetermined constant width therein extending throughout the peripheral surface toward and ending adjacent the central portion of the side surfaces, the narrow recess having facing parallel surfaces collapsed upon each other in a rest position, the narrow recess being adapted to receive and engage small articles disposed therein having a thickness greater than the predetermined constant width of the narrow recess, the narrow recess being adapted to retain by frictional engagement small articles disposed within the narrow recess and for dispensing the small articles therefrom.

12. A device for delivering, storing, and dispensing fish hooks comprising a body portion having oppositely disposed sides surfaces and a peripheral surface extending about the exterior of the body portion between the oppositely disposed side surfaces, the side surfaces having a central portion joining the side surfaces to one another, the peripheral surface and the body position adjacent to the peripheral surface having a narrow recess of predetermined constant width therein extending throughout the peripheral surface toward and ending adjacent the central portion of the side surfaces, the narrow recess having facing parallel surfaces collapsed upon each other in a rest position, the narrow recess being adapted to receive and engage fish hooks disposed therein having a thickness greater than the predetermined constant width of the narrow recess, the narrow recess being adapted to retain by frictional engagement fish hooks disposed within the narrow recess and for dispensing the fish hooks therefrom, and a fish hook disposed in the narrow recess of the dispenser.

\* \* \* \* \*